(12) United States Patent
Fithian et al.

(10) Patent No.: US 9,973,790 B2
(45) Date of Patent: May 15, 2018

(54) MULTIMEDIA SYSTEM HAVING AN ADAPTIVE MULTIMEDIA CONTROLLER

(71) Applicant: International Business Machines Corporation, Armonk, NY (US)

(72) Inventors: Rachel H. Fithian, Raleigh, NC (US); Hugh E. Hockett, Raleigh, NC (US); Aaron J. Quirk, Cary, NC (US); David V. Rooney, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 247 days.

(21) Appl. No.: 14/862,237

(22) Filed: Sep. 23, 2015

(65) Prior Publication Data

US 2017/0085925 A1 Mar. 23, 2017

(51) Int. Cl.

| H04N 21/234 | (2011.01) |
| H04L 29/06 | (2006.01) |
| H04N 21/442 | (2011.01) |
| H04N 21/233 | (2011.01) |
| H04N 21/2668 | (2011.01) |
| H04N 21/472 | (2011.01) |
| H04N 21/6587 | (2011.01) |
| H04N 5/232 | (2006.01) |

(52) U.S. Cl.
CPC ... H04N 21/23424 (2013.01); H04L 65/4069 (2013.01); H04L 65/4084 (2013.01); H04L 65/602 (2013.01); H04N 21/233 (2013.01); H04N 21/2668 (2013.01); H04N 21/44218 (2013.01); H04N 21/472 (2013.01); H04N 21/6587 (2013.01); H04N 5/232 (2013.01)

(58) Field of Classification Search
CPC .......... H04L 65/4084; H04N 21/44218; H04N 5/232; H04N 5/23206; H04N 21/472
See application file for complete search history.

(56) References Cited

U.S. PATENT DOCUMENTS

| 2004/0031045 A1* | 2/2004 | Ivanyi | H04H 60/33 725/14 |
| 2004/0205334 A1* | 10/2004 | Rennels | H04H 20/31 713/154 |
| 2012/0179787 A1* | 7/2012 | Walsh | H04L 63/0281 709/219 |
| 2012/0260170 A1 | 10/2012 | Bhogal et al. | |
| 2014/0173051 A1* | 6/2014 | Sagayaraj | H04W 4/18 709/219 |
| 2014/0321671 A1* | 10/2014 | An | H03G 3/02 381/109 |
| 2015/0070516 A1* | 3/2015 | Shoemake | H04N 21/42203 348/207.11 |
| 2015/0324362 A1* | 11/2015 | Glass | G06F 17/30864 707/725 |

* cited by examiner

*Primary Examiner* — Jeong S Park
(74) *Attorney, Agent, or Firm* — Cantor Colburn LLP

(57) ABSTRACT

An adaptive multimedia system includes a display, an audio device, and an adaptive media controller configured to selectively communicate with a media source and selectively signal the media source to stream only a desired portion of a media stream.

10 Claims, 2 Drawing Sheets

MULTIMEDIA SYSTEM HAVING AN ADAPTIVE MULTIMEDIA CONTROLLER

BACKGROUND

The present invention relates to the art of multimedia systems and, more particularly, to a multimedia system having an adaptive multimedia controller that adjusts media streams based on client events.

Currently, many individuals stream multimedia data through an Internet connection to a multimedia system. The Internet connection may be established through a variety of providers including cable, satellite, and mobile device providers. The multimedia system may include a display, an audio device, and the like. For example, the multimedia device may be embodied in a smartphone, a computer monitor, a tablet, a laptop computer, or a television. The multimedia data is typically provided in one or more streams including a video stream and an audio stream. Often times, only one stream may be desired. For example, a user may want to perceive only an audio portion of a media stream, or only a video portion of a media stream. Thus, there may not be a need to stream all data associated with a particular media stream.

SUMMARY

According to an embodiment of the present invention, an adaptive multimedia system includes a display, an audio device, and an adaptive media controller configured to selectively communicate with a media source and selectively signal the media source to stream only a desired portion of a media stream.

According to another embodiment of the present invention, a computer implemented method of selectively adapting a media stream to a multimedia system includes receiving, by the multimedia system, a media stream from a content provider, detecting an event associated with the multimedia system, transmitting, by a processor, a control signal to the content provider specifying at least one undesirable portion of the media stream, receiving, at the multimedia system, a modified media stream that consists of desirable portions of the media stream.

According to yet another embodiment of the present invention, a computer program product for selectively adapting a media stream to a multimedia system includes a computer readable storage medium having computer readable program instructions embodied therewith. The program instructions are executable by a processor to perform a method including receiving, at the multimedia system, a media stream from a content provider to the multimedia system, detecting an event associated with the multimedia system, transmitting, by a processor, a control signal to the content provider specifying at least one undesirable portion of the media stream, and receiving, at the multimedia system, a modified media stream that consists of desirable portions of the media stream.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
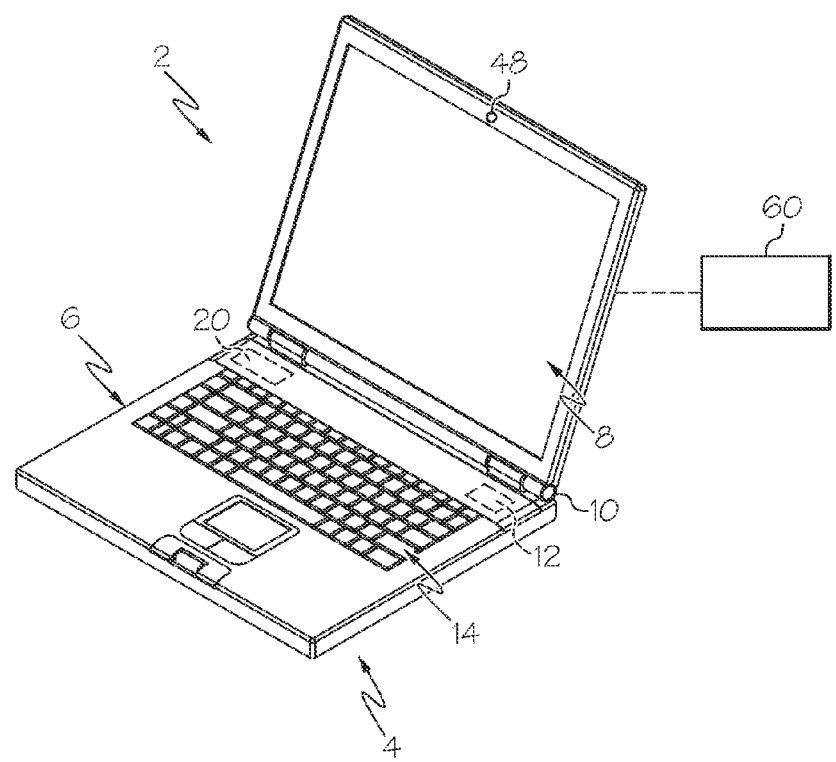
FIG. 1 depicts a multimedia system including an adaptive media controller, in accordance with an exemplary embodiment.

With reference to FIG. 1, an adaptive multimedia system, in accordance with an aspect of an exemplary embodiment, is indicated generally at 2. Adaptive multimedia system 2 is shown in the form of a laptop computer 4. However, it should be understood that adaptive multimedia system 2 may take on a variety of forms including portable devices such as smartphones, tablets, and the like as well as less portable devices such as desktop computer systems, televisions, entertainment systems, and the like. Adaptive multimedia system 2 includes a housing 6 that may support a display 8. In the exemplary aspect shown, display 8 is supported to housing 6 through a hinge 10. It should be realized that display 8 may also be remote from housing 6 and connected through a wired and/or wireless connection. Further, it should be understood that display 8 could be built into housing 6 without the need for a hinge.

Adaptive multimedia system 2 may also include an audio device 12 that could take the form of a speaker (not separately labeled) or provide a connection, through for example, a headphone jack, wireless communication or the like, to an audio device. Additionally, adaptive multimedia system 2 may include a keyboard 14 that provides a user interface. Of course, other forms of user interfaces, such as remote control devices, soft or virtual keyboards, and the like may also be employed.

Figure 2:
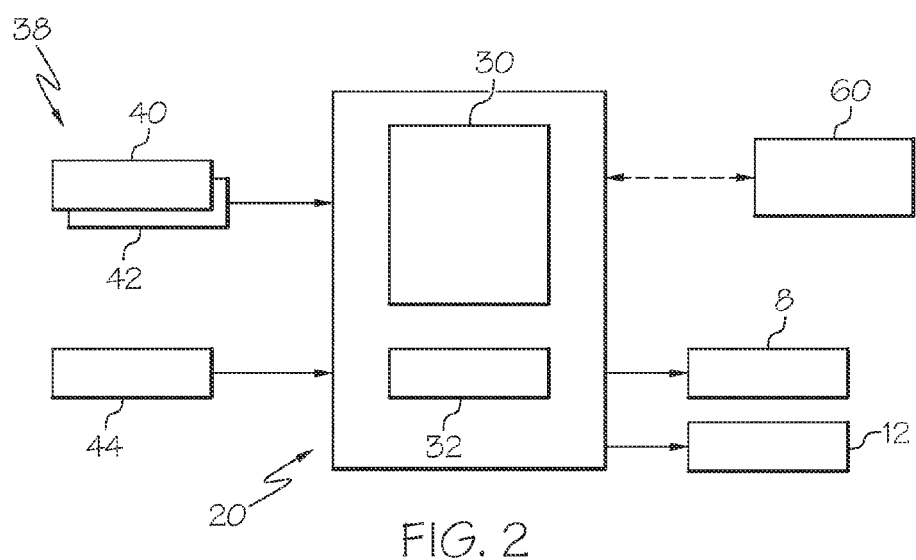
FIG. 2 is a block diagram depicting the adaptive media controller, in accordance with an aspect of an exemplary embodiment.

In accordance with an aspect of an exemplary embodiment, adaptive multimedia system 2 includes an adaptive media controller 20 which, as will be detailed more fully below, selectively controls media streams based on one or more events. As shown in FIG. 2, adaptive media controller 20 may include a central processing unit (CPU) 30 operatively associated with a non-volatile memory 32 which may store a set of computer implemented instructions for controlling media streams. Of course, it should be understood, that adaptive media controller 20 may be built into other components of adaptive multimedia system 2.

In accordance with an aspect of an exemplary embodiment, adaptive media controller 20 may also be operatively connected to one or more event sensors 38. Event sensors 38 may include a display sensor 40 that may determine whether display 8 is active. For example, display sensor 40 may detect an application of power to display 8. Display sensor 40 could be built into hinge 10 or form part of an overall control system for multimedia system 2. Event sensors 38 may also include an audio sensor 42 that may determine whether audio device 12 is active. For example, audio sensor 42 may determine whether a mute feature is activated, either through a hardware device, such as keyboard 14, or through a software application.

Adaptive multimedia system 2 may also include one or more user sensors 44 that may detect user related parameters. For example, user sensor 44 may take the form of a proximity sensor to determine whether a user is present at display 8; or an eye gaze detector that may determine whether a user is watching display 8. Further, user sensor 44 may take the form of a camera 48 associated with multimedia system 2. Camera 48 may capture images of a user(s) for analysis by one or more algorithms (not shown) to determine presence, eye gaze, or other parameters that may determine whether the user is focused on visual content on display 8. Adaptive media controller 20 may rely on one or more inputs from event sensors 38 and/or user sensor(s) 44 to tailor a media stream transmitted to multimedia system 2 from a media source 60 to user circumstances, and/or preferences, as will be detailed more fully below.

Figure 3:
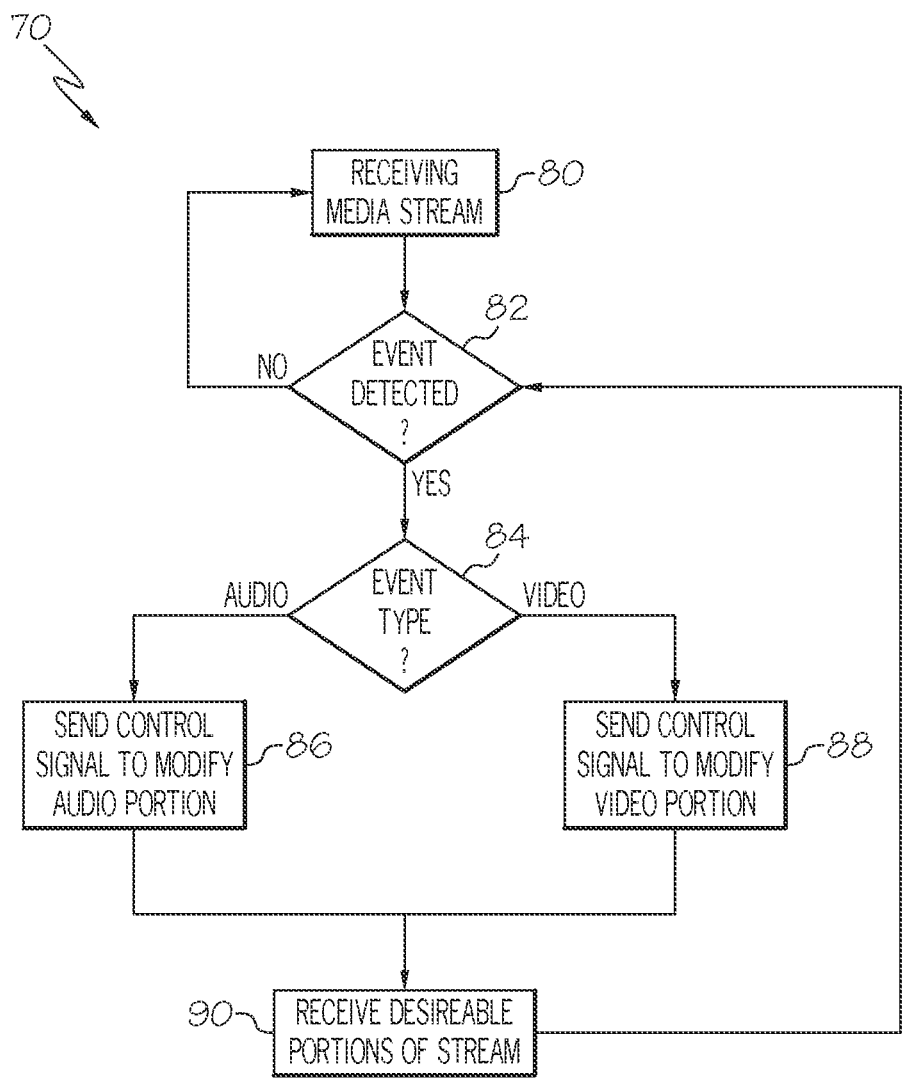
FIG. 3 is a flow diagram depicting a method of selectively adapting a media stream to the multimedia system of FIG. 1, in accordance with an aspect of an exemplary embodiment.

Reference will now follow to FIG. 3 in describing a method 70 of selectively adapting a media stream to multimedia system 2. In block 80, a media stream is received from media source 60. In block 82, a determination is made whether an event is detected. If an event has occurred, in block 84 an event type determination is made. For example, a determination is made whether the event is an audio related event and/or a video or display related event.

If an audio event is detected in block 84, adaptive media controller 20 may signal media source 60 to transmit one or more replacement parameters, such as a signal to replace an audio portion of a media stream with a highly compressible replacement audio stream portion in block 86. For example, adaptive media controller 20 may send a control signal to media source 60 requesting that audio portion of the media stream be replaced by a highly compressible audio signal. In accordance with an aspect of an exemplary embodiment, if audio device 12 is muted, a highly compressible audio stream may be matched to audio device 12. For example, if audio device 12 has a frequency range of 100 Hz-10,000 Hz, the adaptive media controller 20 may send a control signal requesting a highly compressible audio signal, which may embody a tone of 5 Hz, be transmitted to multimedia system 2. In this case, a tone of 5 Hz would be outside the frequency response capability of audio device 12 and thus could not be produced. Alternatively, the highly compressible audio tone could be a uniform tone at a frequency not detectable by a human ear.

If a video event is detected in block 84, such as an interruption of power to display 8, adaptive media controller 20 may signal media source 60 to transmit one or more replacement parameters, such as a signal to replace a video portion of a media stream with a highly compressible replacement video portion in block 88. For example, adaptive media controller 20 may send a control signal to media source 60 requesting that the video portion of the stream be replaced by a highly compressible video signal. In accordance with an aspect of an exemplary embodiment, the highly compressible video signal may embody a uniform video signal, such as a color. In accordance with an aspect of an exemplary embodiment, adaptive media controller 20 may send a control signal to media source 60 requesting that the video portion of the stream be replace by a black screen signal.

In either case, bandwidth requirements for the media stream may be greatly reduced without detracting from an overall user experience. More specifically, undesirable portions of a media stream may be replaced by a highly compressible signal to enhance an overall perception of the desirable portion of the media stream. Further, if a subsequent event is detected, for example, audio device 12 is unmuted, or power is restored to display 8, adaptive media controller 20 may send a control signal to media source 60 to resume the full stream. That is, the highly compressible portion of the stream may be replaced with original portions of the stream.

At this point, it should be understood that the exemplary embodiments describe a system for tailoring bandwidth of a streaming signal to user requirements, circumstances, and the like. By replacing undesirable portions of a media stream with a highly compressible signal, bandwidth may be reduced which could result in a cost savings depending upon available media plans. Further, the reduction in bandwidth requirements would reduce and/or eliminate buffering issues that could occur when streaming data intensive media streams through a slow internet connection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of selectively adapting a media stream to a mobile device comprising:

receiving, at the mobile device, a media stream sent from a content provider, wherein the mobile device includes an audio device capable of outputting audio in a frequency range;

detecting, by the mobile device, an event associated with the mobile device, wherein the detecting of the event includes detecting, by the mobile device, a muting of the audio device;

upon detecting the muting of the audio device, transmitting, by the mobile device, a control signal to the content provider specifying at least one undesirable portion of the media stream, wherein the control signal requests that replacement parameters be transmitted from the content provider to the mobile device for the at least one undesirable portion of the media stream, wherein transmitting the control signal from the mobile device to the content provider includes the mobile device instructing the content provider to substitute the at least one undesirable portion with a high compressible audio signal that has a frequency that is outside the frequency range of the audio device; and after the control signal is transmitted to the content provider, receiving, at the mobile device, a modified media stream that consists of desirable portions of the media stream and the highly compression audio signal.

2. The computer implemented method of claim 1, wherein the highly compressible audio signal comprises a uniform audio signal.

3. The computer implemented method of claim 1, wherein transmitting the control signal from the mobile device to the content provider includes the mobile device instructing the content provider to replace the at least one undesirable portion with a uniform video signal.

4. The computer implemented method of to claim 1, wherein detecting the event associated with the mobile device includes determining a power state of a display and detecting the muting of the audio device.

5. The computer implemented method of claim 1, wherein the frequency range of audio device is 100 Hz to 10,000 Hz, and wherein the highly compressible audio signal comprises a 5 Hz tone.

6. A computer program product for selectively adapting a media stream to a mobile device, the computer program product comprising a non-transitory computer readable storage medium having computer readable program instructions embodied therewith, the program instructions being executable by a processor to perform a method comprising:

receiving, at the mobile device, a media stream sent from a content provider, wherein the mobile device includes an audio device capable of outputting audio in a frequency range;

detecting, by the mobile device, an event associated with the mobile device, wherein the detecting of the event includes detecting, by the mobile device, a muting of the audio device;

upon detecting the muting of the audio device, transmitting, by the mobile device, a control signal to the content provider specifying at least one undesirable portion of the media stream, wherein the control signal requests that replacement parameters be transmitted from the content provider to the mobile device for the at least one undesirable portion of the media stream, wherein transmitting the control signal from the mobile device to the content provider includes the mobile device instructing the content provider to substitute the at least one undesirable portion with a highly compressible audio signal that has a frequency that is outside the frequency range of the audio device; and after the control signal is transmitted to the content provider, receiving, at the mobile device, a modified media stream that consists of desirable portions of the media stream and the highly compression audio signal.

7. The computer program product of claim 6, wherein the highly compressible audio signal comprises a uniform audio signal.

8. The computer program product of claim 6, wherein transmitting the control signal from the mobile device to the content provider includes the mobile device instructing the content provider to replace the at least one undesirable portion with a uniform video signal.

9. The computer program product of claim 6, wherein detecting the event associated with the mobile device includes determining a power state of a display and detecting the muting of the audio device.

10. The computer program product of claim 6, wherein the frequency range of audio device is 100 Hz to 10,000 Hz, and wherein the highly compressible audio signal comprises a 5 Hz tone.

* * * * *